United States Patent [19]
Claassen

[11] Patent Number: 6,049,510
[45] Date of Patent: Apr. 11, 2000

[54] ROBUST AND INTELLIGENT BEARING ESTIMATION

[75] Inventor: John P. Claassen, Albuquerque, N.Mex.

[73] Assignee: Sandia Corporation, Albuquerque, N.Mex.

[21] Appl. No.: 09/215,627

[22] Filed: Dec. 17, 1998

[51] Int. Cl.[7] .................................................. G01S 15/00
[52] U.S. Cl. .............................. 367/99; 367/118; 342/195
[58] Field of Search .................................... 367/118, 119, 367/121, 124, 191, 907, 99; 342/195

[56] References Cited

U.S. PATENT DOCUMENTS

| | | | |
|---|---|---|---|
| 5,495,256 | 2/1996 | Piper | 342/195 |
| 5,610,612 | 3/1997 | Piper | 342/195 |
| 5,949,739 | 9/1999 | Reese | 367/100 |

OTHER PUBLICATIONS

Jurkevics, A., "Polarization Analysis of Three–Component Array Data," *Seismological soc of Amer*, vol. 78, No. 5, pp 1725–1753 (Oct. 1988).

Lilly, Jonathan M., et al., "Multiwavelet spectral and Polarization Analyses of Seismic Records," *Geophys. J., Int.*, vol. 122, pp 1001–1021 (1995).

Vildale, J.E., "Complex Polarization Analysis of Particle Motion," *Seismological Soc. of Amer.*, vol. 76, No. 5, pp 1393–1405 (Oct. 1986).

*Primary Examiner*—Ian J. Lobo
*Attorney, Agent, or Firm*—Rusell D. Elliott; Jeffrey D. Myers

[57] ABSTRACT

A method of bearing estimation comprising quadrature digital filtering of event observations, constructing a plurality of observation matrices each centered on a time-frequency interval, determining for each observation matrix a parameter such as degree of polarization, linearity of particle motion, degree of dyadicy, or signal-to-noise ratio, choosing observation matrices most likely to produce a set of best available bearing estimates, and estimating a bearing for each observation matrix of the chosen set.

41 Claims, 13 Drawing Sheets

ROBUST AND INTELLIGENT BEARING ESTIMATION

GOVERNMENT RIGHTS

The Government has rights to this invention pursuant to Contract No. DE-AC04-94AL85000 awarded by the U.S. Department of Energy.

BACKGROUND OF THE INVENTION

1. Field of the Invention (Technical Field)

The present invention relates to bearing estimation for accurate location of seismic, acoustic, and other energy transmissive events.

2. Background Art

As the monitoring thresholds of global and regional seismic networks are lowered, bearing estimates become more important to the processes which associate (sparse) detections and which locate events. Current methods of estimating bearings (azimuth from north) from observations by three-component stations (which sense motions in three dimensions simultaneously) and arrays lack both accuracy and precision. Here, accuracy is defined as the precision of the measurement plus the (mean) bias, as may be introduced by a non-homogeneous propagation medium. Precision is the root mean square of the fluctuation in the bearing estimate. Methods are required which will develop all the precision inherently available in the arrival, determine the measurability of the arrival, provide better estimates of the bias induced by non-homogeneous media, permit estimates at low SNRs (signal-to-noise ratios), provide physical insight into the effects of the medium on the estimates, and ultimately produce accurate bearing estimates.

An intelligent estimation process for three-component stations is provided by the present invention. The method, sometimes referred to herein as SEEC (Search, Estimate, Evaluate, and Correct), adaptively exploits all the inherent information in the arrival at every step of the process to achieve optimal results. The approach uses a consistent and robust mathematical framework to define the optimal time-frequency windows on which to make estimates, to make the bearing estimates themselves, to withdraw metrics helpful in choosing the best estimate(s) or admitting that the bearing is immeasurable, and to combine the better estimates on various windows to achieve all the accuracy inherently available. The approach is conceptually superior to current 3 component methods, particularly those that rely on real valued signals, and with minor adjustment is also applicable to estimating bearings on arrays, consisting of many 1, 2 or 3 component receivers.

Other methods of data analysis have been employed which perform polarization analysis of the data, including Vidale, J. E., "Complex Polarization Analysis of Particle Motion", *Bull. of the Seismological Soc. of America*, Vol. 76, No. 5., pp. 1393–1405 (October 1986); Jurkevics, A., "Polarization Analysis of Three-Component Array Data", *Bull of the Seismological Soc. of America*, 78, No. 5., pp. 1725–1743 (October 1988); and Lilly, J. M. et al., "Multiwavelet Spectral and Polarization Analysis of Seismic Records", *Geophysical Journal International*, Vol. 122, pp. 1001–1021 (1995). Jurkevics operates only on real-valued signals, providing azimuths with a standard deviation of about 10° to 12°. Although Jurkevics advocated the use of polarization properties to isolate intervals on which to make bearing estimates, no rationale was offered to isolate the appropriate estimation interval. Indeed, Jurkevics makes a suggestion of using the peak SNR, based on background noise, an approach which fails in practice because it does not account for signal-induced noise. Vidale does not provide bearing estimates. Lilly et al. introduce the use of Slepian wavelets to estimate polarization properties. However, the Slepian wavelets do not adequately minimize bandpass leakage and their work does not address bearing estimates.

SUMMARY OF THE INVENTION
(DISCLOSURE OF THE INVENTION)

The present invention is of a method of bearing estimation. It is based on the following assumptions: 1) not all frequencies or time intervals will be equally effective in producing measurable bearings, 2) only those time-frequency windows having good polarization properties will result in usable estimates, 3) the estimates themselves may be frequency dependent, i.e., frequency dependent refraction or scattering at work, and 4) those estimates having the largest effective degrees of freedom (the confidence measures of the invention) will experience the greatest variance reduction and therefore are the best estimates to combine for a refined estimate which may include bias corrections.

The method of the invention also comprises of the following steps: a) quadrature digital filter the arrivals into overlapping bandpass intervals; b) at each center frequency construct a plurality of complex valued observation matrices on short overlapping time intervals whose durations are proportional to the filter length; c) determine from each observation matrix parameters such as the degree of polarization, the linearity of particle motion, the degree of dyadicy, and the signal to noise ratio; d) concatenate contiguous observation matrices having the better polarization properties; e) estimate bearings from those concatenated observation matrices, f) select the bearings estimates having better precision; and g) combine the selected estimates to achieve all the accuracy inherently available. In the preferred embodiment, filtering is by Slepian wavelets weighted to minimize bandpass leakage, preferably weighted by a Hanning taper. A bank of filters characterized by a constant time-bandwidth product is preferably employed, as is spectral decomposition into quadrature signals whose center frequencies are logarithmically spaced and whose bandpasses overlap, preferably by approximately 50%.

Since the approach typically yields a multiplicity of bearing estimates from various time-frequency intervals, an information theoretic rationale is preferably applied to select those estimates having the best precision. Choosing preferably involves only selecting estimates having an effective degrees of freedom exceeding a predetermined threshold. Here the effective degrees of freedom is calculated as the time-bandwidth product of the underlying concatenated observation matrix multiplied by a coherency or statistically based signal-to-noise ratio (SNR). In effect the SNR is based on a short time interval and may be regarded as an "instantaneous" estimate which not only account for the background noise but also the noise generated by the signal. The effective degrees of freedom not only plays an essential role in selecting the better estimates but also in optimally combining all the available estimates into a single best estimate with enhanced accuracy. The construction of this single best estimate may include methods of correcting for bearing bias as induced by a non-homogeneous medium.

When the medium is homogeneous, a single best bearing estimate $\Phi$ is formed from the preferentially selected set of estimates by calculating an average of the bearing estimates weighted by the corresponding effective degrees of freedom as follows $$\hat{\Phi} = \frac{\sum_f \hat{\phi}(f) \cdot dof(f)}{\sum_f dof(f)}$$

where dof(f) is the effective degrees of freedom associated with the estimate at frequency f and $\hat{\phi}(f)$ is the measured bearing at frequency f. When the medium is not homogeneous, a collection of reference events whose locations are known within a small region may be employed to calculate the frequency dependent biases for that region as follows $$bias(f) = \frac{\sum_i (\hat{\phi}_i(f) - \phi_i(true)) \cdot dof_i(f)}{\sum_i dof_i(f)}$$

where $dof_i(f)$ is the effective degrees of freedom associated with the estimate at frequency f and event i, $\hat{\phi}(f)$ is the frequency dependent estimate at frequency f for event i, and $\Phi_i(true)$ is a true bearing for event i. Then, bearing estimates for subsequent events arising from the same region may be computed as follows $$\hat{\Phi} = \frac{\sum_f (\hat{\phi}(f) + bias(f)) \cdot dof(f)}{\sum_f dof(f)}$$

The method is useful for events observed in various propagation environments to include seismic, acoustic, and electromagnetic. The method is not limited to observations made on three-component sensors but with slight adaptation can also be applied to single component or three component spatial arrays of sensors.

A primary object of the present invention is to provide bearing estimates which have better accuracy and precision than heretofore possible for seismic and similar events. The primary advantages of the present invention are that it 1) develops all the precision inherently available in an arrival when it is contaminated by noise and medium induced multipath by searching for those time-frequency intervals having the best polarization properties, 2) enables estimates at lower signal-to-noise, 3) establishes an optimal rationale for estimating bearing bias when present, and 4) optimally combines estimates at individual time-frequency intervals with or without bias correction as may be appropriate.

Other objects, advantages and novel features, and further scope of applicability of the present invention will be set forth in part in the detailed description to follow, taken in conjunction with the accompanying drawings and tables, and in part will become apparent to those skilled in the art upon examination of the following, or may be learned by practice of the invention. The objects and advantages of the invention may be realized and attained by means of the instrumentalities and combinations particularly pointed out in the appended claims.

A BRIEF DESCRIPTION OF THE DRAWINGS AND TABLES

The accompanying drawings and tables, which are incorporated into and form a part of the specification, illustrate several embodiments of the present invention and, together with the description, serve to explain the principles of the invention. The drawings and tables are only for the purpose of illustrating a preferred embodiment of the invention and are not to be construed as limiting the invention. In the drawings and tables:

Figure 6:
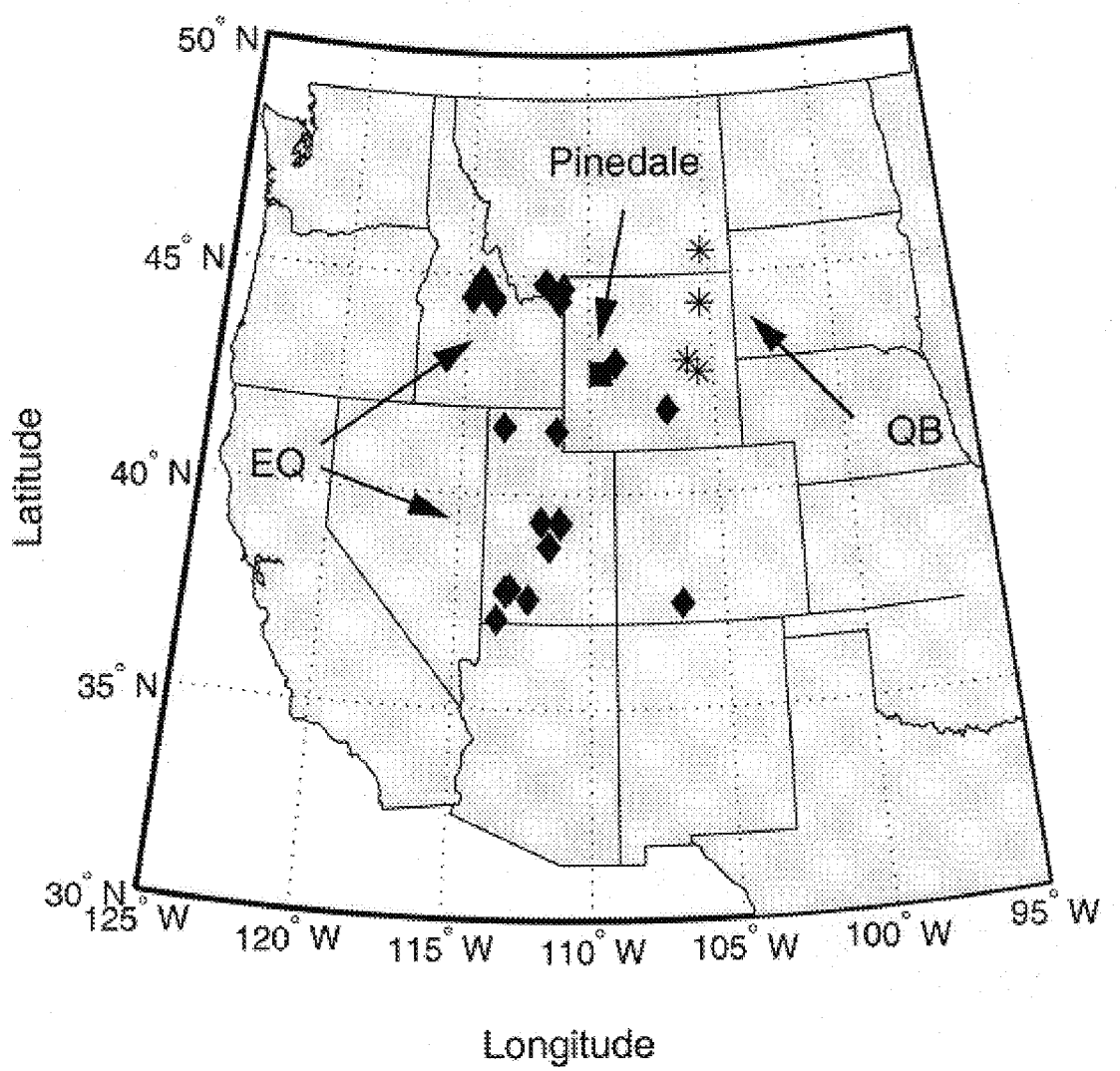
Figure 7A:
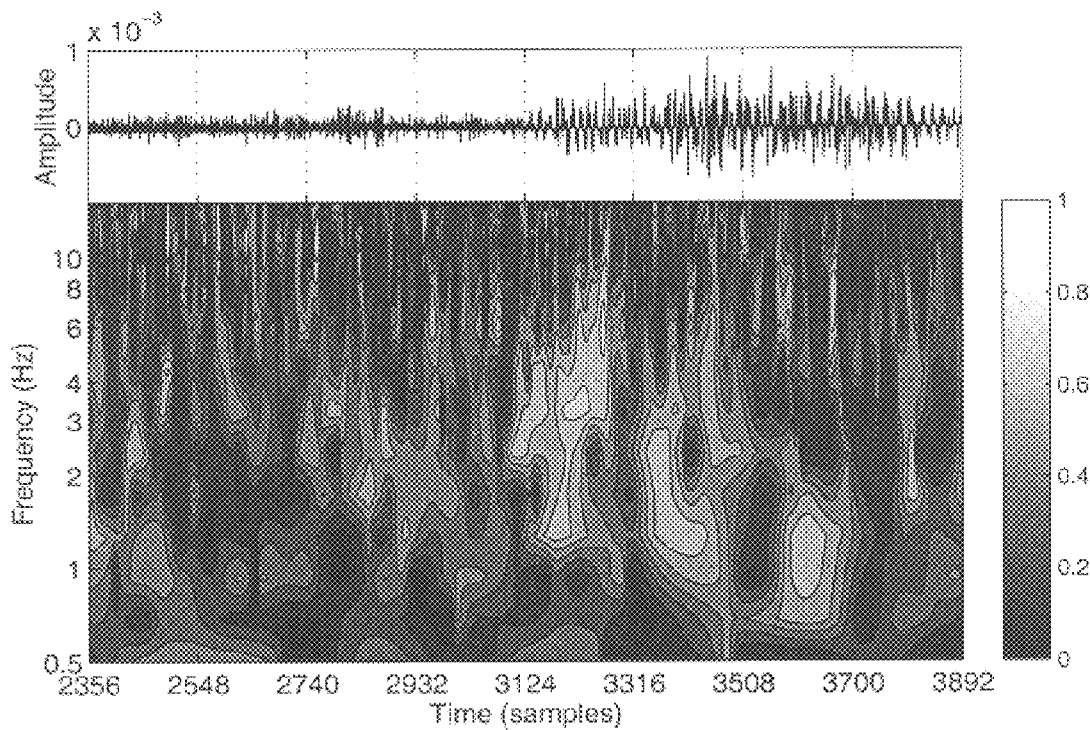
Figure 7B:
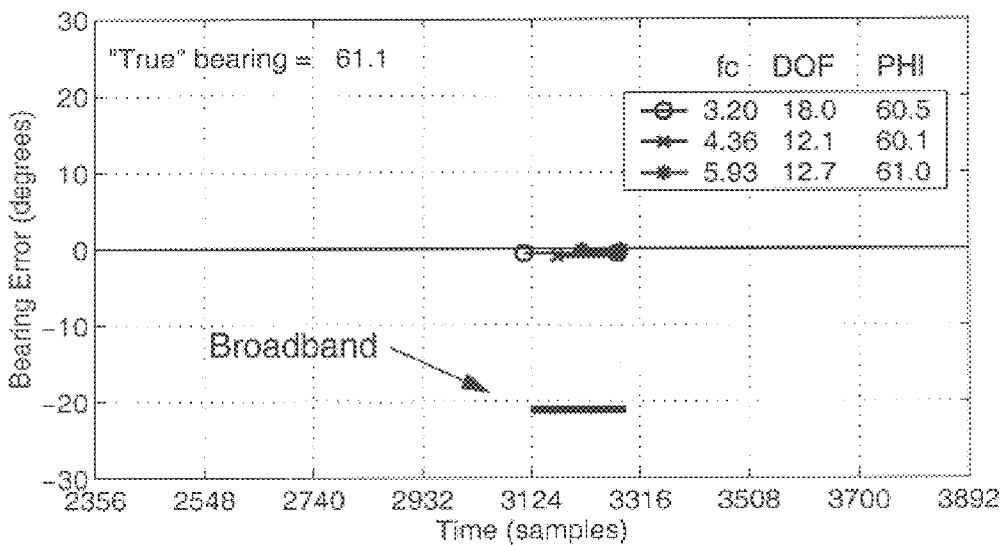
Figure 8A:
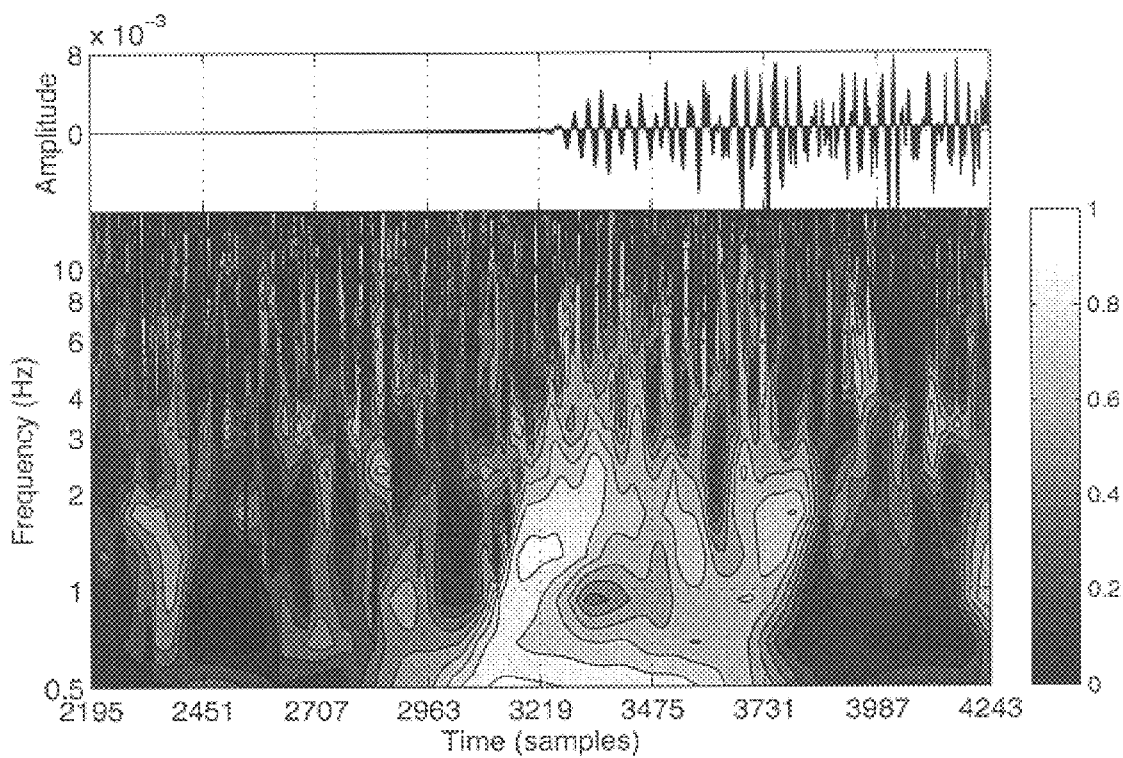
Figure 8B:
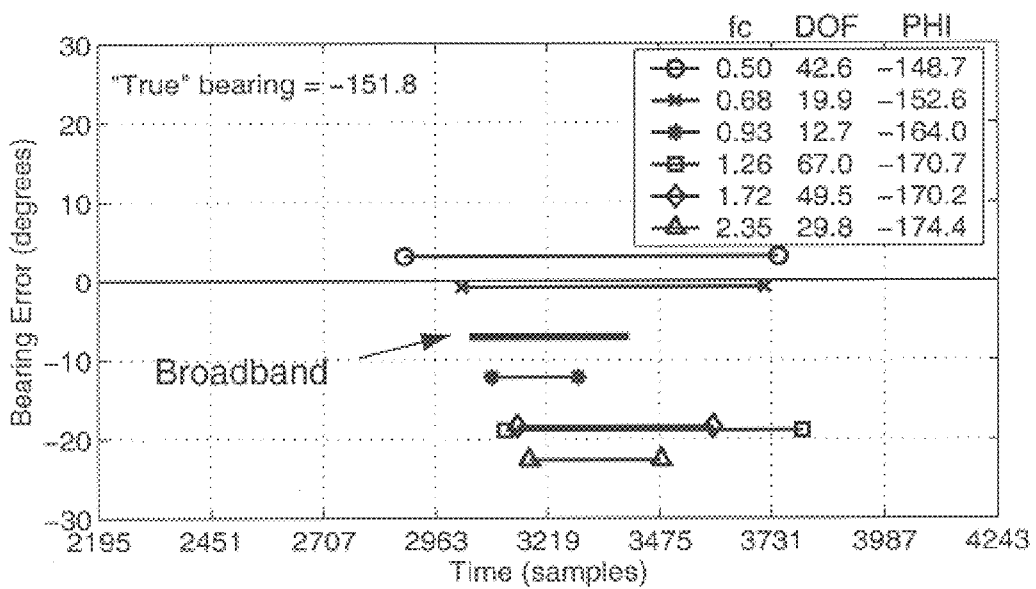
Figure 9A:
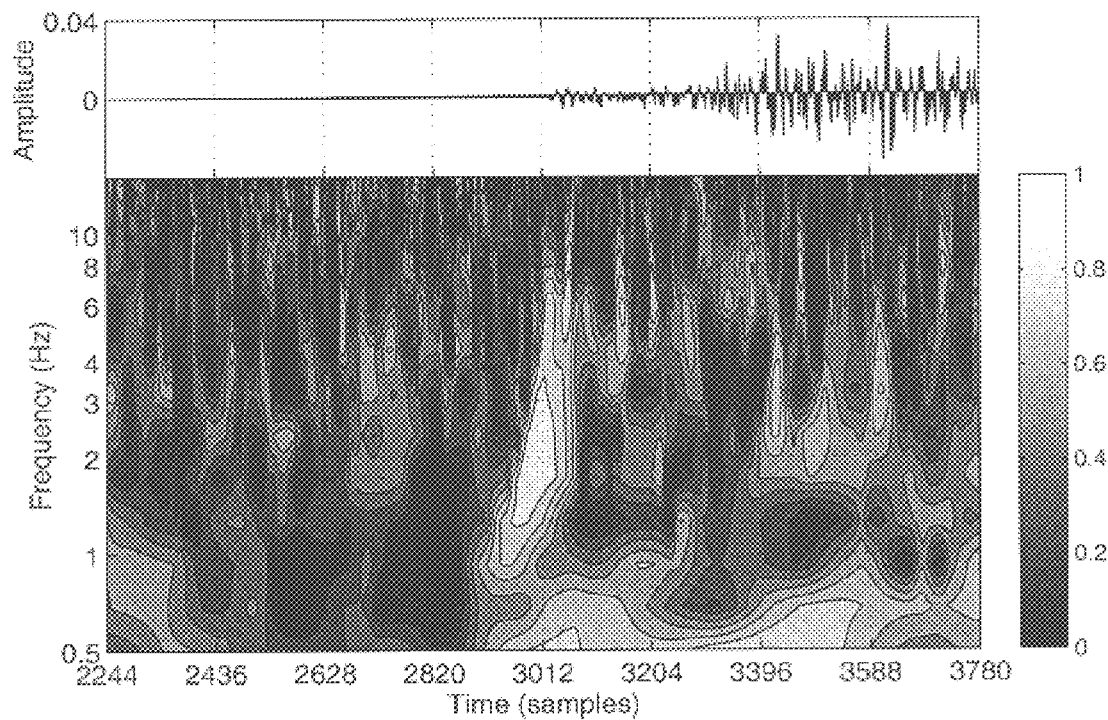
Figure 9B:
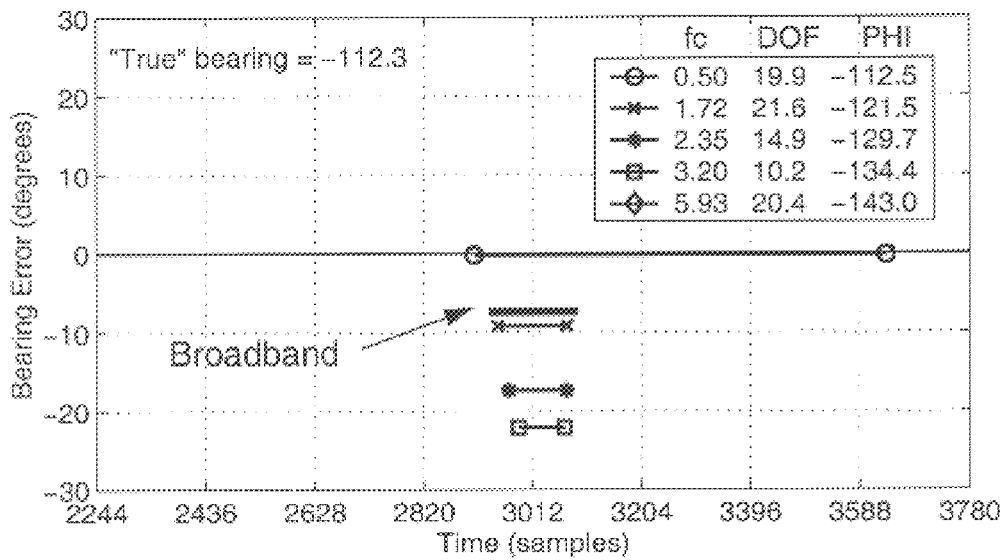
Figure 10:
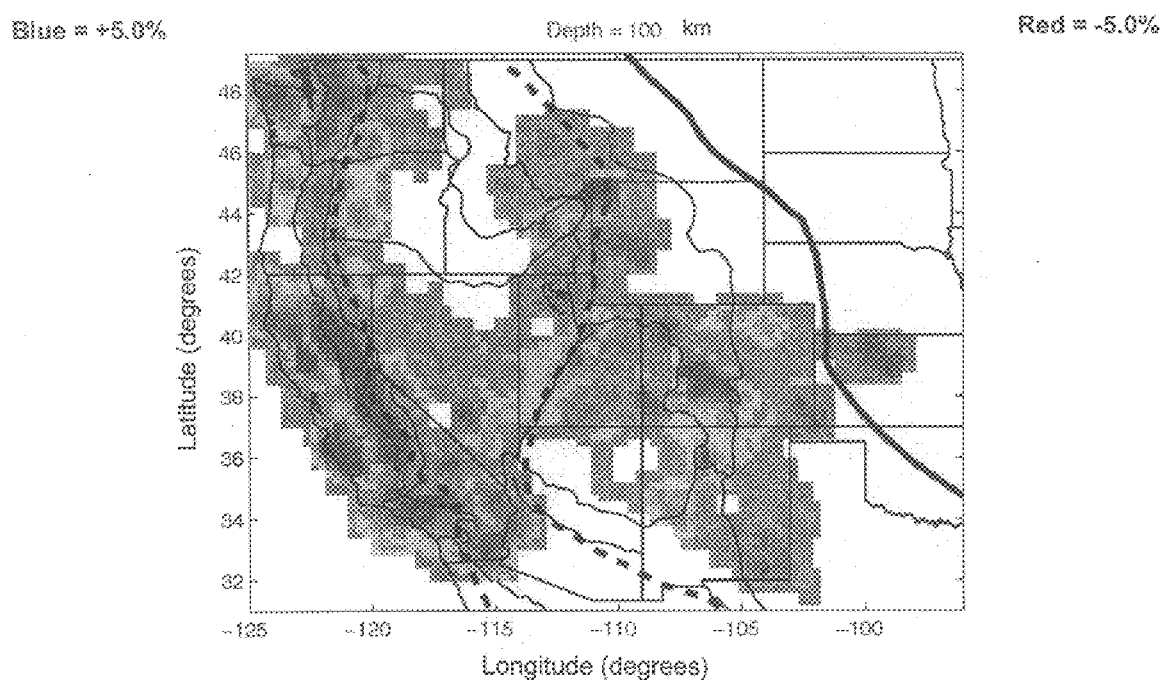
Figure 11:
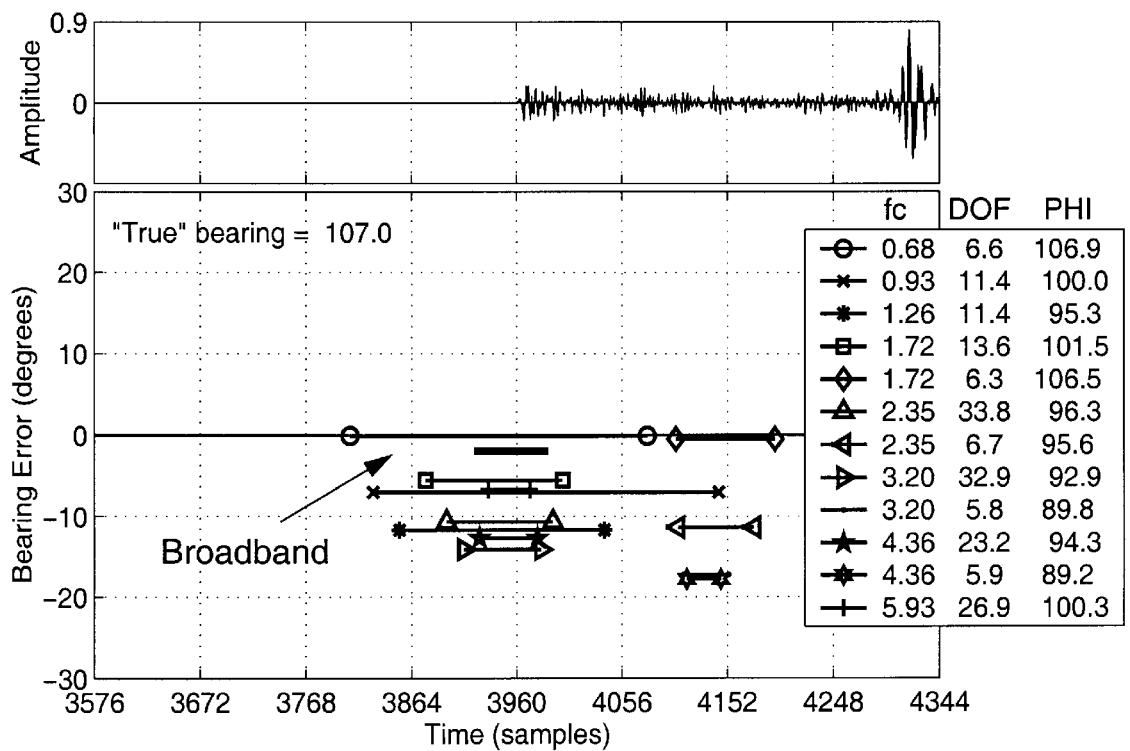
Figure 12A:
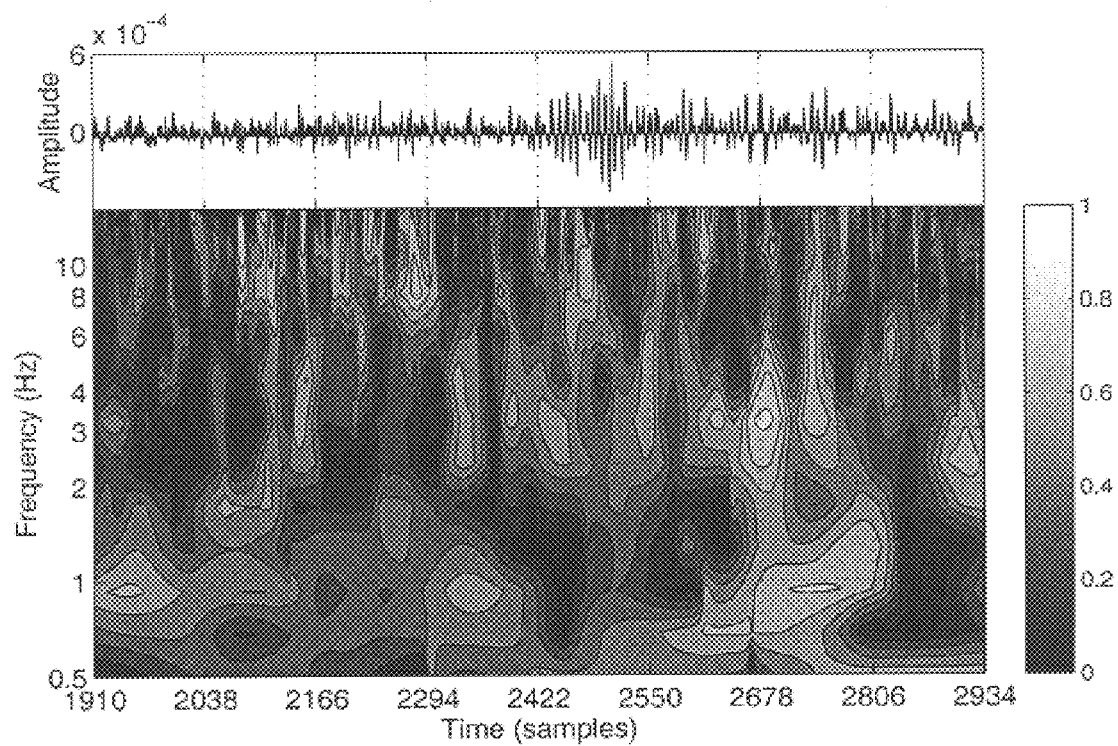
Figure 12B:
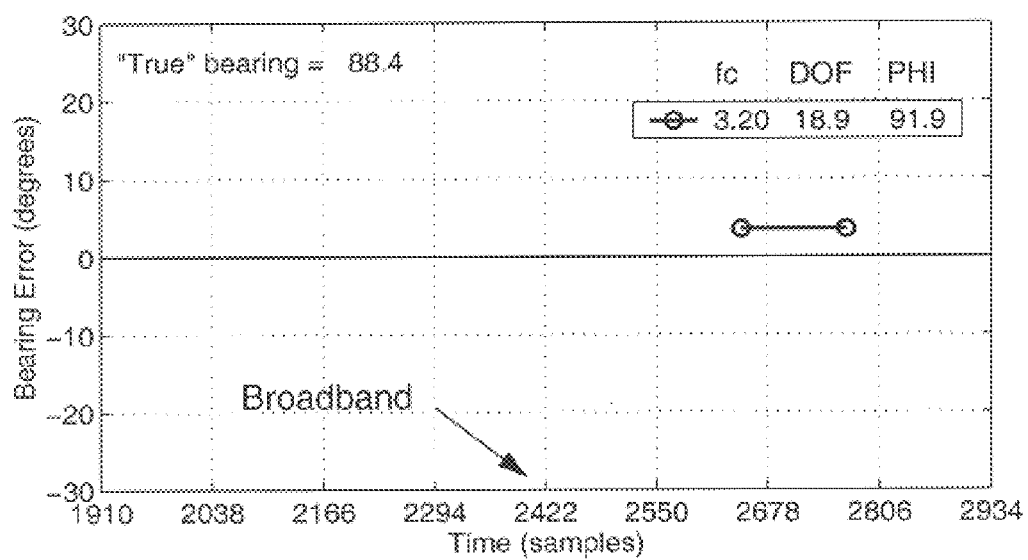
Figure 13A:
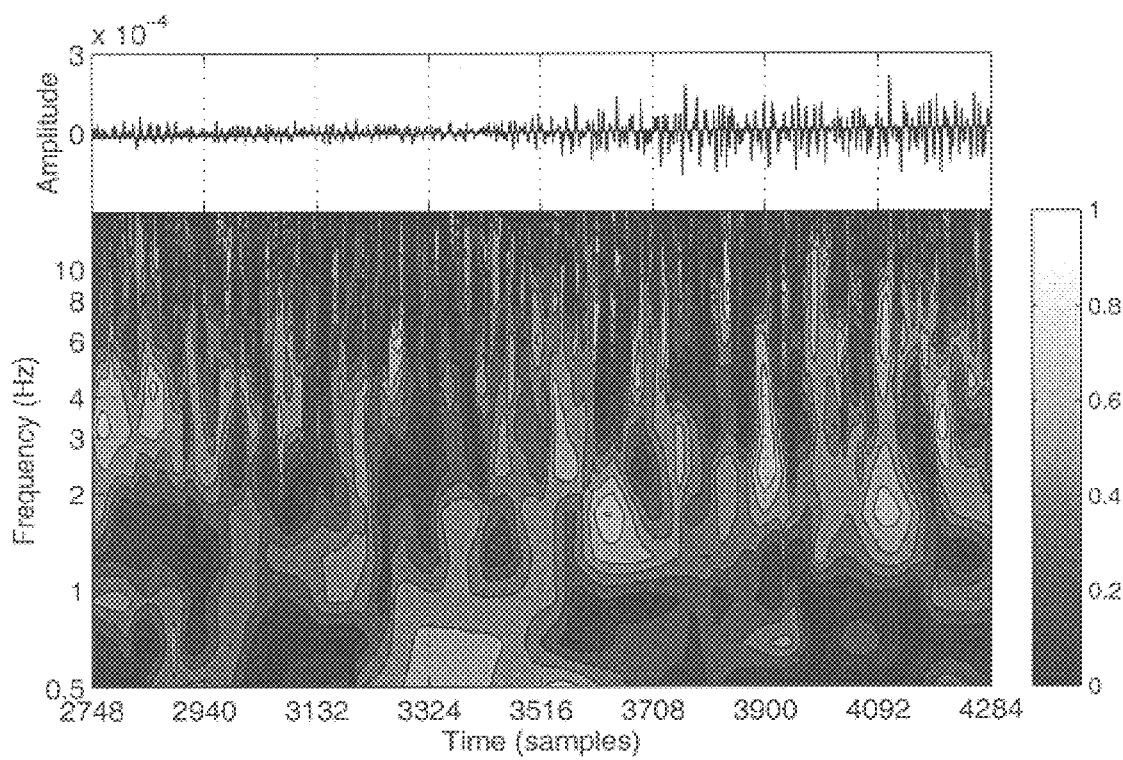
Figure 13B:
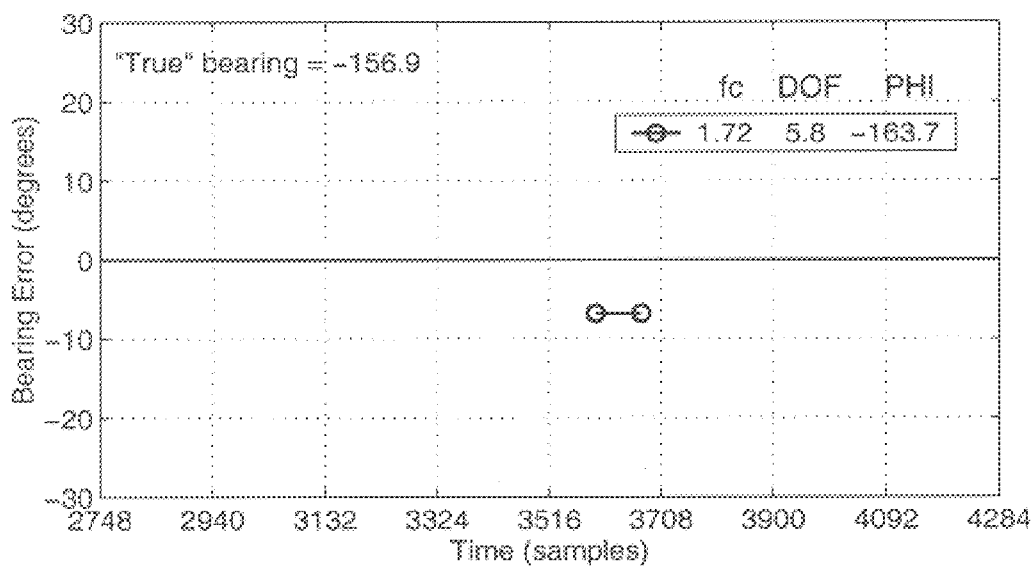

FIG. 6 plots the locations of the illustrative events contributing to an evaluation according to the present invention;

FIG. 7a illustrates that a composite indicator identifies windows in time and frequency having polarized content for a quarry shot;

FIG. 7b plots the error of the bearing estimates made according to the present invention for the quarry shot of FIG. 7a, illustrating that windows having 20 or more effective degrees-of-freedom (DOF) produce reasonably good estimates, especially in comparison to the conventional broadband estimate;

FIG. 8a illustrates that the composite polarization indicator finds significant polarized content for an arrival associated with an earthquake in southern Utah;

FIG. 8b plots the error of the bearing estimates made according to the present invention for the event of FIG. 8a, illustrating strong evidence for bearing dispersion (frequency dependent refraction and absorption at work) along a Utah to Wyoming path;

FIG. 9a illustrates that the composite indicator finds polarized content over a broad range of frequencies for an earthquake in northern Utah;

FIG. 9b plots the error of the bearing estimates made according to the present invention for the event of FIG. 9a, providing additional evidence for bearing dispersion along a Utah to Wyoming path;

FIG. 10 is an illustration of the measured velocity gradients at a depth of 100 km across the western United States of America, affirming the cause for frequency dependent refraction and absorption along the Utah to Wyoming path;

FIG. 11 plots the error of the bearing estimates made according to the present invention showing that a complicated bearing dispersion characteristic can occur at local distances, dispersion being evident in two arrivals;

FIG. 12a illustrates that the search process of the invention finds strong polarized responses deep in a P arrival;

FIG. 12b plot the error of the bearing estimates made according to the present invention for the event of FIG. 12a, illustrating that the strong polarized responses result in a pair of favorable bearing estimates;

FIG. 13a illustrates a weak and thin polarization response;

FIG. 13b plots the error of the bearing estimates made according to the present invention for the event of FIG. 13a, illustrating that bearings are not always measurable;

Table 1 shows tabularly that simple bias corrections at individual frequencies, although improving the accuracy of the individual estimates, still lacks accuracy; and Table 2 shows tabularly that by combining the individual bias corrected estimates in a weighted manner the final single estimate exhibits considerable accuracy.

DESCRIPTION OF THE PREFERRED EMBODIMENTS

Best Modes for Carrying Out the Invention

Figure 1:
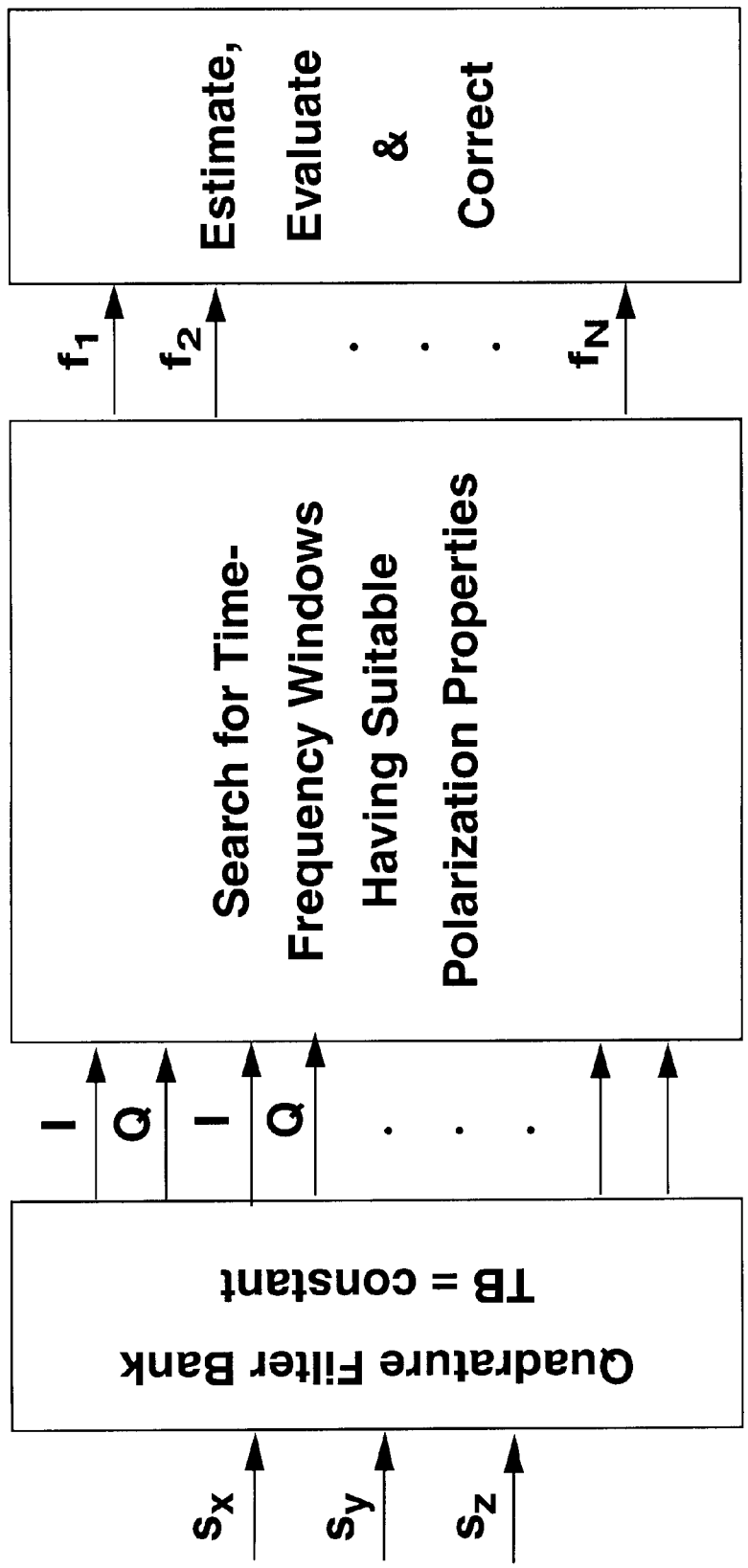
FIG. 1 is a block diagram of the bearing estimation method of the present invention.
Figure 2:
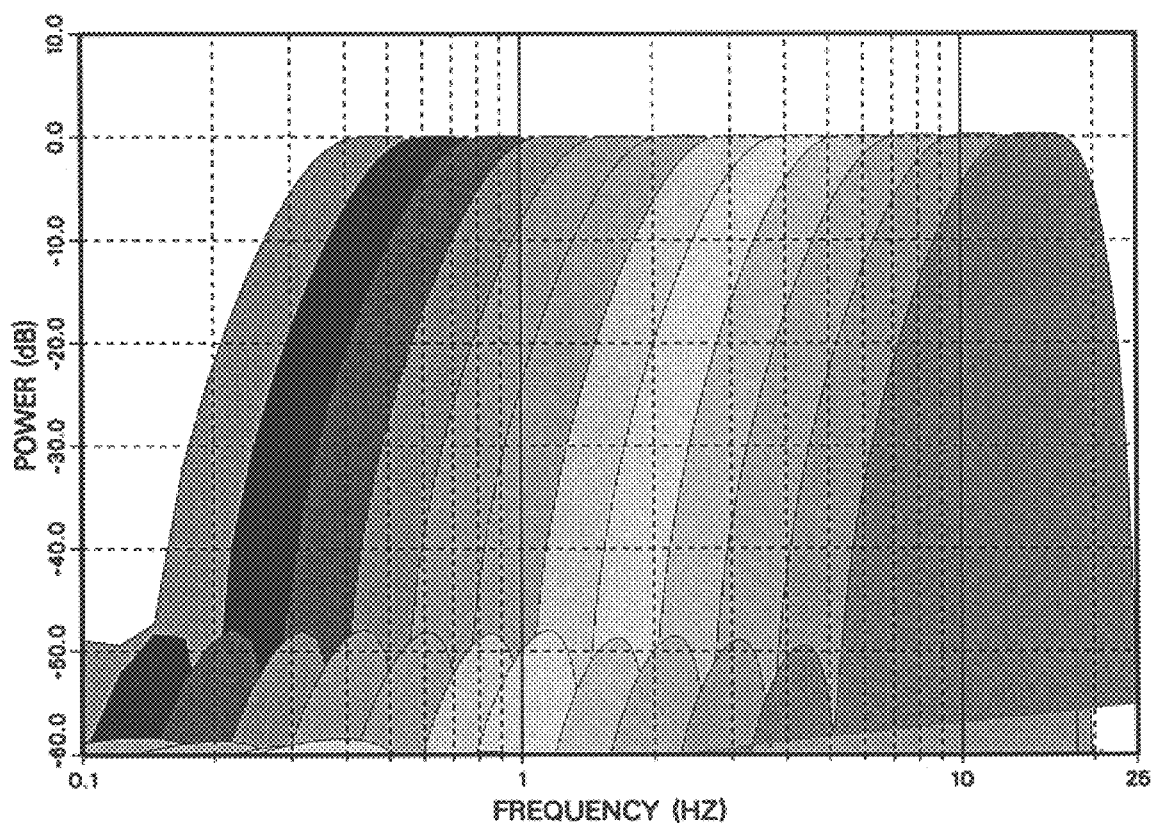
FIG. 2 illustrates the bandpass characteristic of a quadrature filter bank preferred for use for seismological observations in the short-period band.

The present invention whose process is depicted in FIG. 1 is of a method for estimating bearings. The method comprises use of a quadrature digital filter bank whose individual filters are based on orthogonal Slepian wavelets having a constant time-bandwidth product (TB) but may be based on other methods of producing narrowband quadrature signals. The wavelets are preferentially Hanning tapered to reduce leakage into the filter sidebands. The modified wavelets are used to spectrally decompose three-component signals into quadrature signals whose center frequencies are logarithmically spaced and whose bandpasses approximately overlap by preferably 50%. The bandpass characteristic of the filter bank when designed for seismic applications is illustrated in FIG. 2. As an alternative to the filter bank, the discrete Fourier transform may be applied to weighted signal windows (for example, Hanning weighted) of duration comparable to that used in the wavelet based approach. In this approach, independent spectra components must be appropriately selected to simulate the operation of the bank of modified Slepian wavelet filters.

The quadrature signal components are used to construct a time series of rectangular complex-valued observation matrices, each centered on a given frequency bandwidth. The observation matrices are preferably based on short time intervals whose lengths are proportional to the length of the filter (T) and are preferably filled with linearly independent signal components arising from two or more Slepian quadrature wavelets centered on the same frequency but contributing different spectral components.

At a given center frequency $f_c$ and a given sample $m_o$ complex valued signals with bandwidth $f_w$ are used to prepare a rectangular observation matrix of the form $$R(f_c, f_w, m_o) = \begin{bmatrix} s_{x1}(f_c, f_w, m_o) & s_{y1}(f_c, f_w, m_o) & s_{z1}(f_c, f_w, m_o) \\ \vdots & \vdots & \vdots \\ s_{xn}(f_c, f_w, m_o) & s_{yn}(f_c, f_w, m_o) & s_{zn}(f_c, f_w, m_o) \end{bmatrix}$$

where $s_{ij}(f_c, f_w, m_o)$ are vectors of complex valued signal samples observed on the ith axis of the seismometer centered about sample $m_o$ and associated with the jth weighted wavelet pair. The singular values $\lambda_k$ and right singular vectors $e_k$ of R may be used to define and search for intervals of time having suitable polarization properties on which to make bearing estimates. For 3 component sensors the most important search parameters to the invention are defined below. The degree of polarization is defined by $$DOP = \frac{\frac{1}{\sqrt{2}}\sqrt{(\lambda_1 - \lambda_2)^2 + (\lambda_2 - \lambda_3)^2 + (\lambda_3 - \lambda_1)^2}}{\lambda_1 + \lambda_2 + \lambda_3}$$

The degree of linear polarization ($e_1$ being the dominant eigenvector) is uniquely defined by $$DOL = \sqrt{\frac{\text{Real}^2(e_{1x}) + \text{Real}^2(e_{1y}) + \text{Real}^2(e_{1z})}{\|e_1\|^2 + \|e_2\|^2 + \|e_3\|^2}}$$

The degree of dyadicy is defined by $$DOD = \frac{\lambda_1}{\lambda_1 + \lambda_2 + \lambda_3}$$

Each provides useful measures to determine the efficacy of a given time-frequency window in producing a measurable bearing. These definitions may be suitably expanded for use on other polarizations and, in general, to observations by arrays. A remaining useful parameter is an "instantaneous" signal to noise ratio SNR given by one of the following forms:

$$SNR = \frac{DOD}{1 - DOD}$$

or $$SNR = \frac{DOP}{1 - DOP}$$

or, in general, $$SNR = \frac{\text{Polarized energy}}{\text{Total energy} - \text{Polarized energy}}$$

The latter form for the SNR may be expressed as an F-statistic based on the underlying signal model and the data.

Figure 3:
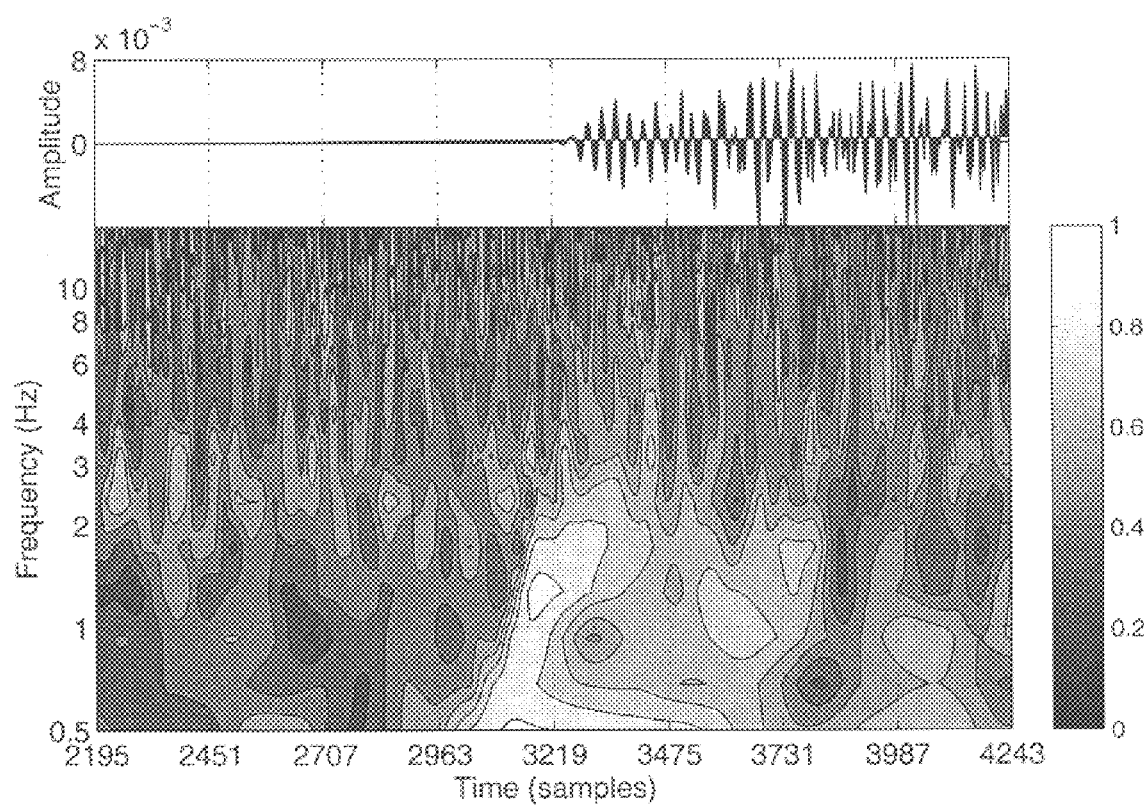
FIG. 3 illustrates that the degree of polarization (DOP) can be used to localize favorable time and frequency intervals for further evaluation under the invention.
Figure 4:
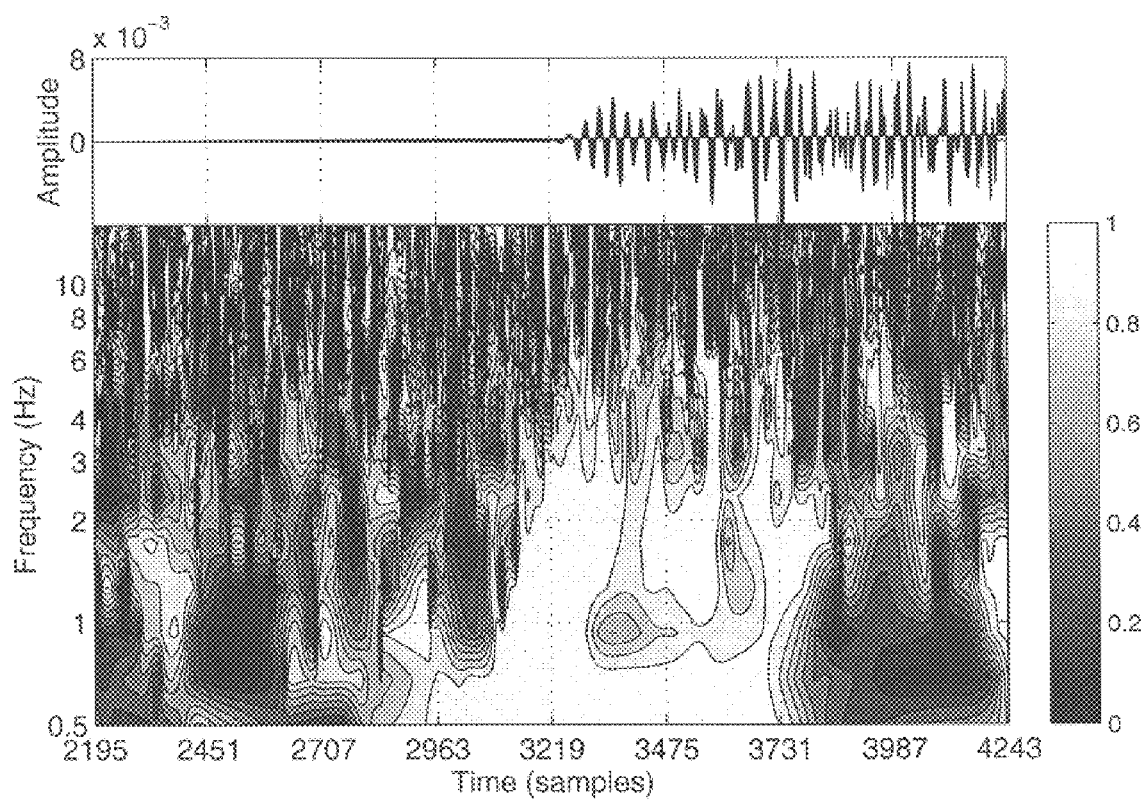
FIG. 4 illustrates that the degree of linear polarization provides additional interval localization information.

Several of the polarization properties used in the invention are illustrated by the spectrograms of FIGS. 3 and 4, in which polarization measures are shown relative to a P wave signal on the z axis. P is the compressional mode of propagation. Other modes are SV (sheer vertical), SH (sheer horizontal), and Rg (Rayleigh, or elliptical particle motion). The graph of FIG. 3 illustrates that the degree of polarization (DOP) can localize the more favorable time and frequency intervals on which to make bearing estimates. The graph of FIG. 4 indicates that the linearly polarized regions can provide additional information on selecting those intervals, especially for P, SV, and SH arrivals. Polarization measures nearing one are considered strong responses. Note that a polarization response can occur before the actual onset of the signal because the quadrature filters are non-causal. Accordingly, an assortment of measures is helpful in searching for those time-frequency windows having strong polarization properties. Bearing estimates are preferably formed on those windows having the best set of polarization properties.

Figure 5:
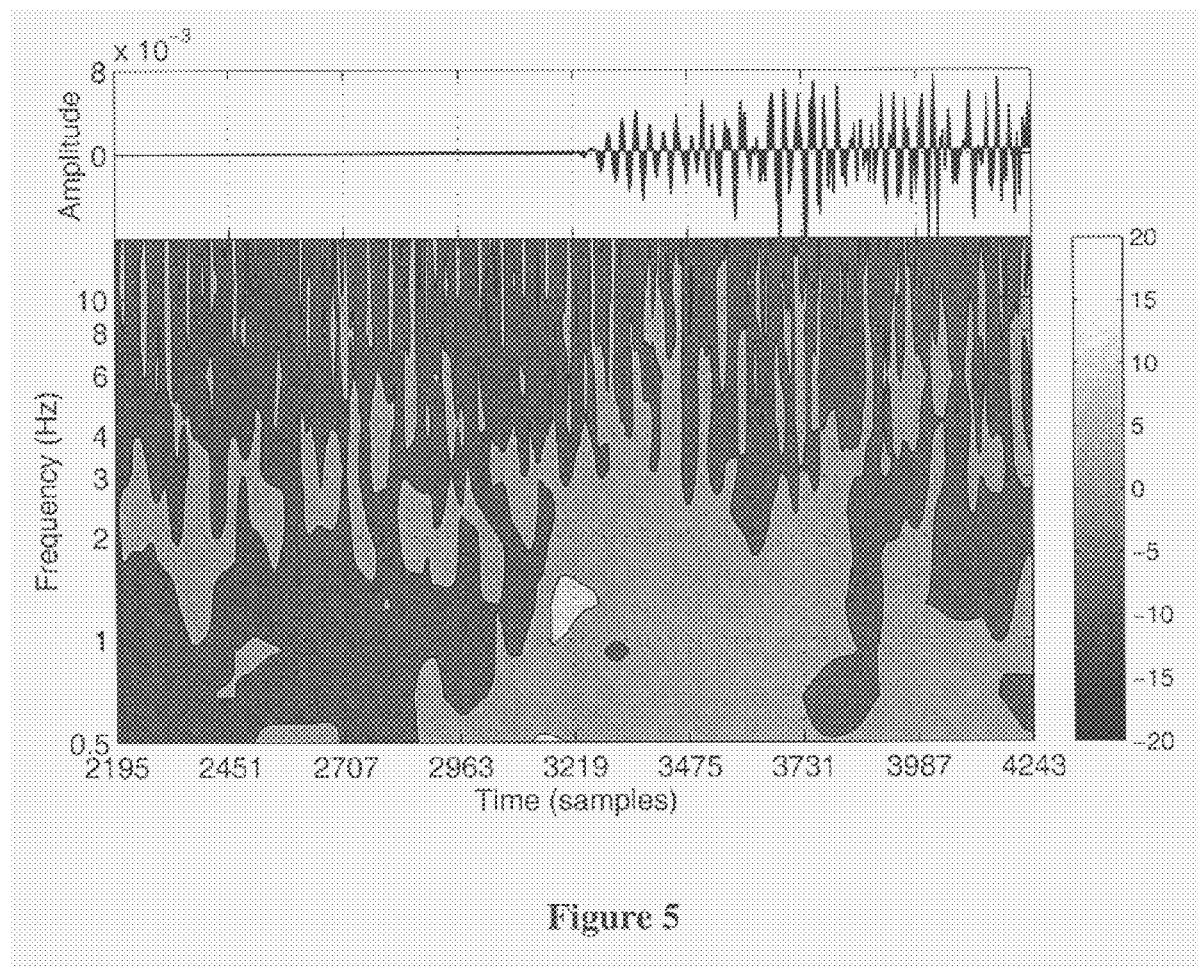
FIG. 5 illustrates via a coherency based SNR that the best time-frequency intervals may differ with the interval associated with the best detection SNR.

The importance of the polarization measures in selecting the proper frequency-time intervals on which to make bearing estimates is further illustrated by examining a coherency based SNR, an example of which appears in the graph of FIG. 5. It is known that the best detection SNR occurs near 1.5 Hz for this arrival. Yet, the graph of FIG. 5 suggests that not only should 1.5 Hz be considered for bearing estimates but that lower frequencies should also be considered. As will be shown, the bearing estimates at the lower frequencies are actually more accurate than the estimates at the higher frequencies (see FIG. 8).

Bearing estimates can be formed in a number of ways as discussed by Walck et al., "Optimal Backazimuth Estimation for Three-Component Recordings of Regional Seismic Events", *Bull. of the Seismological Soc. of America,* Vol. 81, No. 2, pp. 643–666 (April 1991). In the present invention, the bearing and apparent incident angle are preferably based on the right principal singular vector of a rectangular observation matrix associated with a selected set of concatenated windows. Because a coherence based SNR can be associated with each row in the matrix, the rows are preferably weighted by its SNR as defined above. Application of the method to a wide variety of events has shown that a bearing on a large time interval can also be based on a SNR weighted average of bearings estimated from the smaller contiguous intervals spanning the large time interval.

For each frequency bearing estimates are restricted to those sets of contiguous time intervals having sufficiently strong polarization properties. Among the available estimates at various time-frequency intervals, the choice of the best estimates is preferably guided by a simple information theoretic principle that yields a confidence measure (called the effective degrees of freedom) for each hearing estimate.

Regardless of the actual estimation method, the best estimates are preferably chosen on the basis of a confidence measure that reflects the degree of variance reduction in the estimate. This evaluation/selection measure states that the variance is reduced by the product of the SNR and the time-bandwidth product (TB) associated with the observation. The SNR is estimated as stated above and the TB product is based on the duration of the window and the bandwidth of the filter. In the specification and claims, the SNR*TB product is also referred to as the effective degrees of freedom (DOF). Only those estimates having an effective DOF exceeding a given threshold are accepted as valid estimates. A consequence of the preferred acceptance process is that multiple or no answers are provided.

When the medium is homogeneous, a single best bearing estimate $\hat{\Phi}$ is formed from the preferentially selected set of estimates by calculating an average of the bearing estimates weighted by the corresponding effective degrees of freedom as follows $$\hat{\Phi} = \frac{\sum_f \hat{\phi}(f) \cdot dof(f)}{\sum_f dof(f)}$$

where dof(f) is the effective degrees of freedom associated with the estimate at frequency f and $\hat{\phi}(f)$ is the measured bearing at frequency f.

In seismological applications where the medium is often non-homogeneous, the set of acceptable estimates may include the effects of frequency dependent bearing biases. To determine these biases for a small region of the earth, the frequency dependent estimates $\hat{\phi}(f)$ for events i={1, 2, . . . , n} occurring in that region are compared with the true (great-circle) bearing $\phi_i$(true) to establish the bearing bias in the following preferred manner $$bias(f) = \frac{\sum_i (\hat{\phi}_i(f) - \phi_i(true)) \cdot dof_i(f)}{\sum_i dof_i(f)}$$

where $dof_i(f)$ is the effective degrees of freedom associated with the estimate at frequency f and event i Once the regional bearing biases are established as a function of frequency for a particular observing station, subsequent estimates for an event arising from the same region may be corrected for bias in the following near optimal manner $$\hat{\Phi} = \frac{\sum_f \hat{\phi}(f) + bias(f)) \cdot dof(f)}{\sum_f dof(f)}$$

to achieve a single accurate bearing for that event.

INDUSTRIAL APPLICABILITY

The method has been evaluated to a considerable extent in a seismically active region and has demonstrated remarkable utility by providing not only the best estimates possible but also insight into the physical processes affecting the estimates. It has been shown, for example, that the best frequency at which to make an estimate may not correspond to the frequency having the best detection SNR and sometimes the best time interval is not at the onset of the signal. The method is capable of measuring bearing dispersion, thereby withdrawing the bearing bias as a function of frequency. The lowest measurable frequency in the dispersion pattern is often a near error-free bearing. These benefits of the invention are helpful in calibrating seismic stations for frequency dependent biases induced by the (non-homogeneous) earth.

The invention is further illustrated by the following non-limiting examples.

EXAMPLE 1

The polarization based bearing estimator of the invention was applied to a reasonably large set of regional P arrivals arising from events located in the western US and observed at a high frequency station located near Pinedale, Wyo. The arrivals were extracted from the S-3 seismometer channel, which had been electronically altered to provide an acceleration output having a nominal 0.5 to 80 Hz bandpass. The bearing estimates were restricted to the central frequencies associated with the filter bank (0.5 to 15 Hz). The locations of the events analyzed appear in the map of FIG. 6.

Bearing error estimates of a select set of events are presented here to illustrate the efficacy of the invention. The errors are compared with the error associated with a conventional broadband estimator whose solution is based on the initial arrival and the principal eigenvector of a real valued covariance matrix. Only those SEEC estimates of the invention having effective DOF above a threshold were accepted and plotted. For most of the error plots a composite polarization indicator reflecting a mixture of polarization measures appears above the bearing error plot to make evident the rationale of the present invention. The bearing errors are drawn over the measurable time-interval as inferred from the polarization properties. The frequency at which the estimate was made is color and symbol encoded in accord with a key appearing to the right in the illustration. The key also provides the effective DOF (SNR*TB) and the actual bearing estimate $\hat{\phi}$ associated with each measurable window.

The graph of FIG. 7 illustrates that the invention can produce nearly correct estimates when the conventional approach fails. This arrival was produced by a quarry shot in eastern Wyoming at a range of 3.4 degrees. Here good estimates appear not only at the onset but also over interior portions of the P arrival. The estimate having the largest DOF (43.4) was able to produce a very accurate bearing. The broadband SNR for this arrival is poor as implied by a comparison of signal and noise amplitudes; however, the invention was capable of identifying spectral components and time intervals having usable polarized states.

EXAMPLE 2

When the invention was applied to an arrival emanating from a magnitude 5.8 earthquake in southern Utah at a range of 6.4 degrees, an interesting bearing dispersion characteristic emerged. As the error graph of FIG. 8 indicates, the initial arrival exhibits bearings that move with frequency to the left of the event as observed from the recording station. The best bearing estimate occurs at the lowest frequency. Lateral refraction apparently causes bearing errors as large as 20 degrees at a frequency of 2.35 Hz. Furthermore, the conventional broadband estimate appears to be a frequency weighted average of the bearings associated with the different frequencies. Further evidence of refraction in Utah is documented by the bearing estimates for an earthquake occurring in northern Utah at a range of 3.1 degrees (See FIG. 9). Here, the estimate for the conventional broadband approach also appears to be a frequency weighted average of the frequency dependent bearings.

This dispersion characteristic was observable in the three-component signals associated with earthquakes all along the Wasatch mountains, which run diagonally from northeastern Utah to southwestern Utah. A probable explanation for the dispersion is the lateral variation in propagational velocities appearing across Utah as illustrated by the graph of FIG. 10. This graph portrays the small changes in P velocity at a depth of 100 km. The color encoded scale covers velocity gradients of ±5% about 8.23 km/sec. These small velocity gradients undoubtedly extrapolate to the uppermost mantle and lower crust and therefore influence regional P arrivals also. The propagational velocity beneath the warmer Wasatch range is lower than the cooler Colorado plateau to the east. This velocity contrast and associated frequency dependent attenuation along the Wasatch range are thought to cause the apparent frequency dependent refraction of the P arrival for events arising along this mountain range. It is theorized that, since the higher frequency components are attenuated more than the low frequency components on a direct path beneath the Wasatch range to the Pinedale station, the dominant high frequency arrivals actual emerge to the east of the range only to be refracted northward by the velocity gradients. On the other hand, the low frequency components are thought to survive the attenuation on the direct path.

EXAMPLE 3

Significant bearing dispersion can also occur over local distances as illustrated by the bearing errors shown in FIG. 11. Here, an arrival arising from an event ½ degrees east of the Pinedale station appears to experience bearing dispersion to the left of the station, although one cannot state this with confidence because the effective DOFs are limited for some of the estimates. The second P arrival, however, appears to confirm the refraction.

Bearing dispersion was frequently evident in the estimates for many of the events. Some dispersion patterns moved to the left and some to the right of the actual event bearing with increasing frequency. Others appear to be scattered about a biased bearing. Some of the patterns appear to be associated with the known tectonics in this area. For example, events north and west of the Yellowstone hot spot are strongly refracted or diffracted to the right. Some of complicated bearing patterns from southern Colorado may have been influenced by the crustal and upper mantle discontinuity along the Wyoming-Colorado border where island arcs are thought to have collided with the North American plate in an earlier geological era and by the warm spot beneath the Sawatch Range. These observations appear to contradict the usual hypothesis where the deviations are attributed to scattering beneath the receiver or source. To observe these orderly dispersions it is important to accept bearing estimates having a sufficient number of effective degrees of freedom, in other words, when the statistical confidence is sufficiently high. This demonstrates that the SEEC invention has remarkable utility by providing no only the best possible estimates but also insight into the physical and statistical processes that affect individual estimates.

EXAMPLE 4

Other attractive features of the invention are evident. The estimates of FIG. 12 show that the best bearing may not always be available at the onset of the arrival. This arrival arose from a quarry blast in eastern Wyoming. The bearing plot demonstrates that the searching method can find frequency-time intervals that yield good estimates under high background and coda noise conditions. Although an assortment of bearings passed the acceptance criterion, the bearing having the highest degrees of freedom gave the best estimate. The final choice of bearing can be coupled with the location process to discard inconsistent bearings.

EXAMPLE 5

Another attractive feature of the invention is that the search for measurable time-frequency windows may at times indicate that there are no windows in which one can reasonably produce estimates with high confidence. This feature is illustrated by the composite polarization indicator of FIG. 13 where attempts to find a sufficiently "long and strong" window failed. This arrival arose from an earthquake located in southern Utah at a range of 5.6 degrees. The signal exhibits a weak polarization property almost everywhere except for a very short interval centered about 1.72 Hz. But even there, the available effective DOF (11.9) failed to meet a reasonable acceptance threshold. Under these circumstances, the path structure or the distributive nature of the source may be complicated or the source moment may be weak such that a coherent/polarized outcome cannot be constructed from the received signals. Because coherency measures are inherently embedded in the invention, a strong basis for discarding an estimate can be constructed.

The bearing biases were determined for a small set of events in Southern Utah. The estimated biases appear in Table 1. There the event name appears in the first column and the remaining columns are identified by their headings. The true azimuth is based on the great circle bearing spanning the true event location and the location of the Pinedale station. The errors associated with the bias corrected estimates appear in the last column. The errors, although small, compared to the uncorrected estimates remain unacceptably large. The global bearing accuracy of this corrected collection of estimates is 6.8 degrees rms.

When a single bearing is constructed from a weighted average of the individually bias corrected estimates at all the frequencies available for a given event, the error is considerably reduced as shown by the entries of Table 2. The RMS accuracy associated with this collection of events improved to 1.1 degrees rms. This demonstrates that several low accuracy estimates for a common event can be corrected for bias and optimally combined to achieve even better accuracy.

TABLE 1

The Improvements in the Individual Bearings Estimates After Bias Correction

| Event | Frequency | Estimate (degrees) | Bias (degrees) | DOF | True (degrees) | Corrected (degrees) | Error (degrees) |
|---|---|---|---|---|---|---|---|
| 24692 | 0.93 | −166.10 | 12.74 | 24.30 | −150.80 | −153.36 | −2.56 |
| 24692 | 1.26 | −170.60 | 18.91 | 144.60 | −150.80 | −151.69 | −0.89 |
| 24692 | 1.72 | −170.60 | 24.20 | 99.70 | −150.80 | −146.40 | 4.40 |
| 24692 | 2.35 | −176.90 | 26.98 | 98.00 | −150.80 | −149.92 | 0.88 |
| 08191 | 0.93 | −162.20 | 12.74 | 36.10 | −150.90 | −149.46 | 1.44 |
| 08191 | 1.26 | −170.00 | 18.91 | 45.10 | −150.90 | −151.09 | −0.19 |
| 08191 | 1.72 | −174.90 | 24.20 | 44.50 | −150.90 | −150.70 | 0.20 |
| 08191 | 2.35 | 177.30 | 26.98 | 21.50 | −150.90 | −155.72 | −4.82 |
| 18192a | 0.93 | −157.00 | 12.74 | 11.80 | −149.80 | −144.26 | 5.54 |
| 18192a | 1.26 | −171.00 | 18.91 | 44.20 | −149.80 | −152.09 | −2.29 |
| 18192a | 1.72 | −178.60 | 24.20 | 20.60 | −149.80 | −154.40 | −4.60 |
| 18192a | 2.35 | −152.90 | 26.98 | 10.30 | −149.80 | −125.92 | 23.88 |
| 18192b | 0.93 | −163.70 | 12.74 | 57.50 | −150.00 | −150.96 | −0.96 |
| 18192b | 1.26 | −166.30 | 18.91 | 91.80 | −150.00 | −147.39 | 2.61 |
| 18192b | 1.72 | −179.30 | 24.20 | 69.10 | −150.00 | −155.10 | −5.10 |
| 18192b | 2.35 | 177.70 | 26.98 | 43.10 | −150.00 | −155.32 | −5.32 |

TABLE 2

The Improvements in the Bearing Estimates After Correcting and Averaging All the Individual Bearings Associated with an Event

| Event | True Bearing (degrees) | Final Estimate (degrees) | Error (degrees) |
|---|---|---|---|
| 24692 | −150.80 | −149.89 | 0.91 |
| 08191 | −150.90 | −151.25 | −0.35 |
| 18192a | −149.80 | −148.47 | 1.33 |
| 18192b | −150.00 | −151.52 | −1.52 |

The preceding examples can be repeated with similar success by substituting the generically or specifically described reactants and/or operating conditions of this invention for those used in the preceding examples.

For some events, a strong physical or statistical basis for accepting estimates cannot be found. Some confusion in accepting outcomes may occur because the ground truth for the events is inaccurate. But in other cases, the structural properties of the path may cause significant loss in polarization content or give rise to a large scatter of bearings. In the case of quarry blasts, the slowly emergent signal is composed of a mixture of weak temporal arrivals, which appear to destroy the coherence required to make an estimate. On the other hand, for measurable events the invention can provide additional insight at differing time-frequency windows in comparison to conventional approaches producing a single estimate.

Experience with the SEEC method has shown that it can be hazardous to arbitrarily choose a time interval or a band of frequencies on which to make an estimate. In doing so, the most useful polarized energy may be missed entirely or a weakly polarized signal may be accepted. It is essential to Search for the appropriate time-frequency windows having good polarized content before making an estimate. Furthermore, it is more important to use a SNR based on polarized coherency rather than on conventional pre-event noise measures to define a given window. It has also been shown that it can be inappropriate to make broadband estimates, which may result in a frequency weighted average of a set of dispersed bearings, particularly in active tectonic areas. Instead, Estimates should be formed on narrow bands and hopefully long time intervals having strong polarization to achieve all the precision inherently available. The use of an Evaluation parameter based on the effective degrees of freedom is a viable approach for accepting the better estimates. Among those accepted estimates, one may have to apply a frequency dependent bias Correction to account for the refraction or diffraction introduced by a non-homogeneous medium. The application of a frequency dependent bias to a collection of the individual high confidence estimates and averaging the corrected estimates can, in many circumstances, provide the event location process with the best possible bearing.

The invention may be applied to other types of polarized arrivals and to their codas. The approach can also be applied to arrays of one-component or three-component receivers. In application of the method to arrays, polarization must simply be defined in a higher-dimensional space, aligned semblance measures can be substituted for linear polarization, and an F-statistic relating the beam energy to the difference of total energy and the beam energy can be used as a measure of the SNR.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of bearing estimation, the method comprising the steps of:
   a) quadrature digital filtering of event observations;
   b) constructing a plurality of observation matrices each centered on a time-frequency interval;
   c) determining for each observation matrix a parameter selected from the group consisting of degree of polarization, linearity of particle motion, degree of dyadicy, and signal-to-noise ratio;
   d) choosing observation matrices most likely to produce a set of best available bearing estimates; and e) estimating a bearing for each observation matrix of the chosen set.

2. The method of claim 1 wherein the filtering step comprises filtering using Slepian wavelets weighted to minimize bandpass leakage.

3. The method of claim 2 wherein the filtering step comprises filtering using Slepian wavelets weighted by a Hanning function.

4. The method of claim 1 wherein the filtering step comprises filtering using a bank of filters characterized by a constant time-bandwidth product.

5. The method of claim 1 wherein the filtering step comprises spectrally decomposing into quadrature signals whose center frequencies are logarithmically spaced.

6. The method of claim 1 wherein the filtering step comprises spectrally decomposing into quadrature signals whose bandpasses overlap.

7. The method of claim 1 wherein the filtering step comprises spectrally decomposing into quadrature signals whose bandpasses overlap by approximately 50%.

8. The method of claim 1 wherein the determining step comprises determining for each observation matrix a coherency based signal-to-noise ratio.

9. The method of claim 8 wherein the determining step comprises determining for each observation matrix a coherency based signal-to-noise ratio by calculating using a step selected from the group consisting of calculating degree of dyadicy divided by (1 minus degree of dyadicy) or calculating degree of polarization divided by (1 minus degree of polarization).

10. The method of claim 9 wherein the choosing step comprises choosing observation matrices having effective degrees of freedom exceeding a predetermined threshold, wherein effective degrees of freedom is calculated as the time-bandwidth product of a given matrix multiplied by the coherency based signal-to-noise ratio of the given matrix.

11. The method of claim 10 additionally comprising the step of forming a single bearing estimate by calculating an average of the bearing estimates of step e) weighted by the corresponding effective degrees of freedom.

12. The method of claim 10 additionally comprising the step of employing the bearing estimates of step e) from one or more events to calculate one or more frequency dependent biases for a subregion of a medium as follows:

$$\frac{\sum_i (\hat{\phi}_i(f) - \phi_i(true)) \cdot dof_i(f)}{\sum_i dof_i(f)}$$

where $dof_i(f)$ is the effective degrees of freedom associated with the bearing estimate at frequency f and event i, $\hat{\phi}_i(f)$ is the frequency dependent estimate at frequency f for event i, and $\phi_i(true)$ is a true bearing for event i.

13. The method of claim 12 additionally comprising the step of correcting bearing estimates for a subsequent event arising from the same sub-region as follows:

$$\frac{\sum_f (\hat{\phi}(f) + bias(f)) \cdot dof(f)}{\sum_f dof(f)}$$

to calculate a single bearing estimate for the subsequent event.

14. The method of claim 1 wherein the method is performed for a plurality of events.

15. The method of claim 1 additionally comprising the step of employing the bearing estimates of step e) to calculate a bias for a sub-region of a medium.

16. The method of claim 15 wherein the employing step comprises employing the bearing estimates of step e) to calculate one or more frequency dependent biases for a sub-region of a medium.

17. The method of claim 1 wherein the filtering step is used on event observations from the group consisting of seismic event observations, acoustic event observations, and event observations of other energy transmissive events.

18. The method of claim 17 wherein the filtering step is used on event observations from three-component observing stations.

19. The method of claim 17 wherein the filtering step is used on event observations from observing array stations consisting of one or more component receiving elements.

20. The method of claim 17 wherein the filtering step is used on event observations of energy passing through a medium selected from the group consisting of astronomical objects, buildings, air, gases, water, and liquids.

21. A method of bearing estimation, the method comprising the steps of:
    a) spectral decomposing a mufti-channel signal into a plurality of time-frequency intervals;
    b) constructing a plurality of complex-valued observation matrices centered on a set of contiguous time-frequency intervals;
    c) determining for each observation matrix a parameter selected from the group consisting of degree of polarization, particle motion characteristics, degree of dyadicy, and signal-to-noise ratio as may apply in multi-channel formulations;
    d) at one or more frequencies concatenating observation matrices from contiguous time intervals having parameters stronger than a predetermined value;
    e) weighting rows on concatenated observation matrices by an associated signal-to-noise ratio; and
    f) estimating a bearing for each weighted observation matrix of the chosen set.

22. The method of claim 21 wherein the spectral decomposing step comprises a bandpass minimization step selected from the group consisting of filtering using Slepian wavelets and filtering using a discrete Fourier transform.

23. The method of claim 22 wherein the spectral decomposing step comprises weighting using a tapering function.

24. The method of claim 21 wherein the spectral decomposing step comprises performing a decomposition characterized by a constant time-bandwidth product.

25. The method of claim 21 wherein the spectral decomposing step comprises spectrally decomposing into quadrature signals or spectra whose center frequencies are logarithmically spaced.

26. The method of claim 21 wherein the spectral decomposing step comprises spectrally decomposing into quadrature signals or spectra whose bandpasses overlap.

27. The method of claim 21 wherein the spectral decomposing step comprises spectrally decomposing into quadrature signals or spectra whose bandpasses overlap by approximately 50%.

28. The method of claim 21 wherein the determining step comprises determining for each observation matrix a coherency based signal-to-noise ratio.

29. The method of claim 28 wherein the determining step comprises determining for each observation matrix a coherency based signal-to-noise ratio by calculating using a step selected from the group consisting of calculating the degree of dyadicy divided by (1 minus degree of dyadicy), calculating degree of polarization divided by (1 minus degree of polarization), and calculating an F-statistic based on predicted polarized energy versus total energy less predicted polarized energy where the notion of polarization may be generalized to more than two dimensions.

30. The method of claim 29 wherein the weighting step comprises employing signal-to-noise ratio on an instantaneous basis.

31. The method of claim 30 additionally comprising the step of assigning an effective degree of freedom to each bearing estimate and selecting only those bearing estimates having effective degrees of freedom exceeding a predetermined threshold, wherein effective degrees of freedom is calculated as time-bandwidth product of an underlying observation matrix multiplied by coherency based signal-to-noise ratio of the same matrix.

32. The method of claim 31 additionally comprising the step of forming a single bearing estimate in homogenous media by calculating an average of the selected bearing estimates weighted by corresponding effective degrees of freedom as follows:

$$\frac{\sum_f \hat{\phi}(f) \cdot dof(f)}{\sum_f dof(f)}$$

where dof(f) is the effective degrees of freedom associated with the bearing estimate at frequency f and $\hat{\phi}(f)$ is a measured bearing at frequency f.

33. The method of claim 31 additionally comprising the step of employing the bearing estimates of step f) from a plurality of events to calculate one or more frequency dependent biases for a subregion of a medium as follows:

$$\frac{\sum_i (\hat{\phi}_i(f) - \phi_i(true)) \cdot dof_i(f)}{\sum_i dof_i(f)}$$

where $dof_i(f)$ is the effective degrees of freedom associated with the bearing estimate at frequency f and event i, $\hat{\phi}_i(f)$ is the frequency dependent estimate at frequency f for event i, and $\phi_i(true)$ is the true bearing for event i.

34. The method of claim 31 additionally comprising the step of correcting bearing estimates for a subsequent event arising from a same sub-region as follows:

$$\frac{\sum_f (\hat{\phi}(f) + bias(f)) \cdot dof(f)}{\sum_f dof(f)}$$

to calculate a single bearing estimate for subsequent events.

35. The method of claim 21 wherein the method is performed for a plurality of events.

36. The method of claim 21 additionally comprising the step of employing the bearing estimates of step f) to calculate a bias for a sub-region of a medium.

37. The method of claim 35 wherein the employing step comprises employing the bearing estimates of step f) to calculate one or more frequency dependent biases for a sub-region of a medium.

38. The method of claim 21 wherein the spectral decomposing step is used on event observations from the group consisting of seismic event observations, acoustic event observations, and event observations of other energy transmissive events.

39. The method of claim 38 wherein the spectral decomposing step is used on event observations from three-component observing stations.

40. The method of claim 38 wherein the spectral decomposing step is used on event observations from a plurality of observing stations comprising a plurality of spatially separated receivers selected from the group consisting of one or more component receiving elements.

41. The method of claim 38 wherein the spectral decomposing step is used on event observations of energy passing through a medium selected from the group consisting of astronomical objects, buildings, air, gases, water, and liquids.

* * * * *